United States Patent [19]

Meehan et al.

[11] 4,045,742
[45] Aug. 30, 1977

[54] HIGH VOLTAGE SHUTDOWN CIRCUIT RESPONSIVE TO EXCESSIVE BEAM CURRENT AND HIGH VOLTAGE

[75] Inventors: David H. Meehan; George J. Tzakis, both of Chicago, Ill.

[73] Assignee: Zenith Radio Corporation, Glenview, Ill.

[21] Appl. No.: 675,680

[22] Filed: Apr. 12, 1976

[51] Int. Cl.² .............................................. H02H 7/20
[52] U.S. Cl. ......................................... 328/9; 315/85; 315/128; 315/308; 325/362; 328/8; 361/91
[58] Field of Search ................. 315/85, 106, 107, 119, 315/127, 128, 291, 307, 308; 317/31; 328/8, 9; 325/362

[56] References Cited

U.S. PATENT DOCUMENTS

| | | | |
|---|---|---|---|
| 3,546,536 | 12/1970 | Umin | 328/9 X |
| 3,813,580 | 5/1974 | Norman | 17/31 X |

OTHER PUBLICATIONS

Martin, *CRT Screen Protection System*, IBM Technical Disclosure Bulletin, vol. 12, No. 11, Apr. 1970, pp. 1738–1740.

*Primary Examiner*—Eugene R. La Roche
*Attorney, Agent, or Firm*—Roy A. Ekstrand

[57] ABSTRACT

A television receiver includes a conventional tri-color cathode ray tube display system having horizontal and vertical scansion systems. Conventional signal receiving and processing circuitry recovers picture, sound and scansion synchronizing information. A high voltage shutdown circuit is responsive to excesses of either high voltage or CRT beam current. The former being detected by a resistance divider coupled between high voltage and ground while the latter is sensed by a resistor placed in series with the secondary winding of the horizontal deflection transformer. A PNP, NPN transistor pair configured to form a switch analogous to a silicon controlled rectifier responds to detected excesses of beam current or high voltage and loads down the operating supply to the horizontal scansion oscillator to terminate high voltage generation. The transistor pair accommodates a degenerating network to reject false triggering.

9 Claims, 1 Drawing Figure

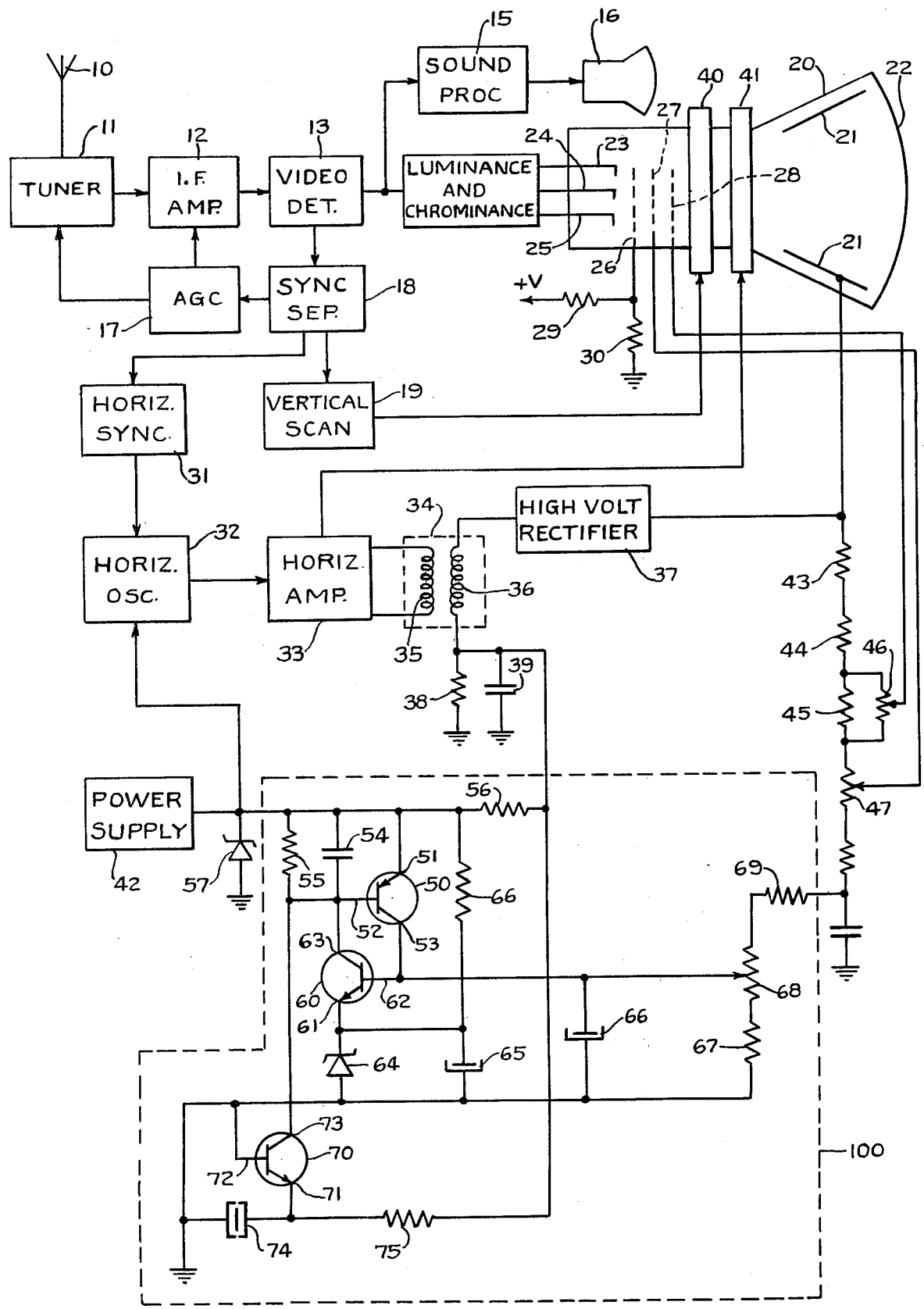

HIGH VOLTAGE SHUTDOWN CIRCUIT RESPONSIVE TO EXCESSIVE BEAM CURRENT AND HIGH VOLTAGE

BACKGROUND OF THE INVENTION

This invention relates generally to television high voltage systems and particularly to shutdown circuits used therein.

In a typical color television receiver scansion and display system, a cathode ray tube (CRT) display device includes a trio of electron beam sources which are directed at a tri-color phosphor viewing screen. Horizontal and vertical scansion circuitry within the receiver locally generate scansion signals which are synchronized to reference information within the received signal. The scansion signals are applied to an electromagnetic deflection yoke positioned on the envelope of the CRT producing vertical and horizontal scansion of the viewing screen. The cathode ray tube requires a number of operating potentials the highest of which is an accelerating potential of approximately 25 to 30 kilovolts which is generally referred to as the high voltage. This potential is applied to an electrode within the CRT to accelerate the electrons within the directed beams to an energy level sufficient to cause light emission by impacted phosphor areas and illumination of the viewing screen.

In the great majority of television receivers the horizontal scansion system produces this high voltage in addition to the horizontal scansion signals. Horizontal scansion includes a relatively slow scan deflection of the electron beams followed by a relatively fast retrace deflection in which the beams are deflected back to the "start" of scan position. The scansion signal producing this retrace comprises a short duration high amplitude pulse which is also used to generate CRT high voltage. Most receivers use a tertiary winding on the horizontal transformer together with a rectifier or voltage multiplier to raise the voltage to sufficient level for high voltage production. In the former system the tertiary transformer winding is rectified directly while in the latter a familiar capacitor diode matrix is used to boost the voltage and rectify.

It is generally desirable for purposes of picture sharpness, brightness and color rendition to maintain a relatively high accelerating potential. However, cathode ray tubes have a tendency to produce prohibitive amounts of radiation when excessive high voltage is used. As a result care must be taken to assure that the accelerating potential does not exceed the radiation producing threshold.

It is well known to employ high voltage shutdown circuitry which monitors the accelerating potential or some related voltage and disables or reduces the accelerating potential in the event of excess output. Such circuitry may include threshold circuitry detecting either the high voltage directly or a voltage derived such as that used for CRT focus. Another alternative is to use circuitry detecting the peak or average voltage of the retrace portion of the horizontal scansion signal which, of course, varies in a predictable relationship with CRT high voltage. In either case, the most typical operation provides complete shutdown of the high voltage system in the event of an excess.

In addition to problems of prohibitive radiation produced by excessive high voltage, cathode ray tubes are susceptible to damage by high currents in conjunction with otherwise unobjectionable accelerating potential levels. The energy with which the accelerated electrons impact the CRT parallax barrier as well as the viewing screen is determined largely by the high voltage but the total energy imparted is, of course, also dependent on the number of impacting electrons (e.g., beam current). High beam currents generate heat which if not dissipated may cause damage to the cathode ray tube itself. For example, the parallax barrier may be overheated or the viewing screen phosphors may be burned. Also excessive locallized heat within the tube may produce fracture of the CRT envelope which, of course, usually renders the tube useless.

For these and other reasons most television receivers include beam current limiting circuitry which functions to minimize or avoid prohibitively high beam current. Such circuits are nearly endless in variety but all can be said to perform the common functions of somehow detecting beam current and acting upon signal processing circuitry (which controls beam current) in a negative feedback manner. Such circuits perform satisfactorily under most conditions but frequently do not provide affirmative protection against the types of failures described above and in some cases may themselves have failure modes which result in production of excessive beam current.

The problems of overdissipation and radiation production of the cathode ray tube in modern television receivers are made more difficult by the improvements in regulation of operating supply and high voltage generating circuitry. Modern circuitry is able to sustain great overloads and still maintain high voltage output. Because these improved systems are capable of producing greater power levels they are not in any real sense "self-limiting". Therefore, while providing considerable advantages in picture quality and other performance criteria, such "stronger" high voltage supplies also have a greater capacity for causing CRT damage in the above-described failure modes.

OBJECTS OF THE INVENTION

Accordingly, it is an object of the present invention to provide an improved high voltage shutdown circuit.

It is a more particular object of the present invention to provide an improved, high voltage shutdown circuit which provides greater protection of the cathode ray tube device.

SUMMARY OF THE INVENTION

High voltage shutdown means for use in a television receiver having a cathode ray tube display device in which one or more electron beams are directed to a viewing screen, means causing the beams to scan the screen, and high voltage generating means producing an electron accelerating potential for the cathode ray tube includes high voltage detecting means producing a first error signal when the accelerating potential exceeds a predetermined voltage, beam current detecting means producing a second error signal when electron beam current exceeds a predetermined level and high voltage disabling means, coupled to the high voltage detecting means and the beam current detecting means, rendering the high voltage generating means inoperative in response to either the first or second error signals.

BRIEF DESCRIPTION OF THE DRAWING

The FIGURE is a partial block schematic detail representation of a color television receiver constructed in accordance with the present invention.

DESCRIPTION OF THE PREFERRED EMBODIMENT

The FIGURE shows a partial block diagram, partial schematic representation of a television receiver constructed in accordance with the present invention. A tuner 11 receives an information bearing signal incident upon antenna 10 which is converted to an intermediate frequency signal and coupled to an intermediate frequency amplifier 12 which in turn amplifies the signal to a level sufficient to drive a video detector 13. The modulation components of picture, sound and deflection synchronization information are recovered from the intermediate frequency signal by detector 13 and are applied to a luminance and chrominance processor 14 which in turn drives the cathode electrodes of a conventional tri-color CRT 20.

The output of video detector 13 is also applied to a sound processor 15, which in turn drives a speaker 16, and a sync separator 18. The latter recovers the horizontal and vertical scan synchronization (sync) pulses. Sync separator 18 also separates the horizontal and vertical scansion synchronizing pulses. The former are applied to a vertical scan system 19 which provides a vertical scansion signal driving a vertical deflection yoke 40 situated on CRT 20. The latter are applied to a horizontal sync system 31. Sync separator 18 also drives an automatic gain control (AGC) voltage generator 17 which by conventional amplitude comparison techniques produces a control voltage which is fed back to amplifier 12 and tuner 11 providing a constant output signal level at detector 13.

A horizontal oscillator 32 generates a horizontal rate scansion signal which is coupled to a horizontal output amplifier 33 raising the scan signal to a sufficient level to drive a primary winding 35 of a horizontal deflection transformer 34. The output of horizontal amplifier 33 is also coupled to a horizontal deflection yoke 41 situated on CRT 20.

Secondary winding 36 of transformer 34 is connected to a high voltage rectifier 37 and to ground through a parallel combination of a resistor 38 and a capacitor 39. The output of high voltage rectifier 37 is connected to an accelerating electrode 21 within CRT 20. High voltage transformer 34 and high voltage rectifier 37 are intended to be exemplary of conventional horizontal deflection and high voltage producing circuitry. Transformer 34 is representative of horizontal output transformers commonly used in color television receivers. High voltage rectifier 37 includes the familiar diode capacitive multiplier matrix. Accordingly, secondary winding 36 produces a driving pulse which is "multiplied" through the familiar action of rectifier 37 to produce an appropriate CRT accelerating voltage.

In the alternative, the equally familiar series rectifier may be used in which case secondary winding 36 would be altered to produce an output pulse of greater amplitude directly producing a rectified high voltage appropriate for application to CRT electrode 21. In either case the function of series resistor 38 and capacitor 39 with respect to the present invention is the same and will be discussed in detail below.

A resistive voltage divider comprising the series combination of resistors 43, 44, 45, potentiometer 47, and resistors 48, 69, 68 and 67 is connected between high voltage electrode 21 and ground. In addition a potentiometer 46 is connected in parallel with resistor 45. The voltage divider thus formed provides a source of several operating potentials for CRT 20. The movable contact of potentiometer 46 is connected to a focus electrode 38 of CRT 20 providing a variable source of focus voltage. Similarly, the movable contact of potentiometer 47 is connected to a screen grid electrode 27 of CRT 20.

CRT 20 is a unitized gun type picture tube in which individual cathode electrodes 23, 24 and 25 are connected to luminance and chrominance processor 14. A control grid electrode 26 is common to all three cathodes and is maintained at a constant potential by a voltage divider formed by resistors 29 and 30 connected between +V and ground. It should be clear that the present invention may be used with any of the presently used cathode ray tube types.

A power supply 42 is shown coupled to shutdown circuit 100 (indicated by dashed lines) and horizontal oscillator 32. For clarity power supply connections to the remaining portions of the receiver are not shown. It should be understood, however, that each of the receiver portions (shown in block form) are powered by a source of operating power in accordance with well known receiver fabrication techniques.

The output of power supply 42 is connected to horizontal oscillator 32 and to the cathode electrode of a Zener diode 57 which has its anode electrode connected to ground. Zener 57 performs the power supply regulation function by prohibiting the output voltage of supply 42 from exceeding the reverse breakdown voltage of Zener 57. Shutdown circuit 100 includes a PNP transistor 50 having an emitter electrode 51 connected to the output of power supply 42, a base electrode 52, and a collector electrode 53, and an NPN transistor 60 having an emitter electrode 61 connected to ground by a Zener diode 64, a base electrode 62 connected to collector 53, and a collector electrode 63 connected to base 52. A parallel combination of a resistor 55 and capacitor 54 couples the junction of base 52 and collector 63 to the output of power supply 42. Emitter 61 is also coupled to ground by a capacitor 65 and to the output of power supply 42 by a resistor 66. Base 62 is connected to ground by a capacitor 66 and to the movable contact of potentiometer 68.

A common base amplifier transistor 70 has an emitter electrode 71 coupled to ground by a non-polar electrolytic capacitor 74, a base electrode 72 connected to ground, and a collector electrode 73 connected to the junction of base 52 and collector 63. A resistor 56 is connected between power supply 42 and the junction of resistor 38, transformer secondary winding 36, and capacitor 39. A resistor 75 connects emitter 71 to the junction of resistors 56 and 38 and capacitor 39.

The operation of the horizontal scansion system shown (with the exception of shutdown circuit 100) is conventional in that a locally generated scansion signal produced by oscillator 32 is applied to horizontal amplifier 33 which produces a high energy horizontal scansion signal applied to yoke 41 and to the primary of the horizontal sweep transformer 34. The high amplitude retrace portion of the horizontal scansion signal is coupled to secondary 36 of transformer 34 producing a high voltage AC signal which is converted by high voltage rectifier 37 to an accelerating potential suitable to drive CRT 20.

As is well known, the high voltage system may be considered the "power source" of the CRT. As a result with the exception of certain leakage currents not of significant interest here, it can be said that the average current supplied by the high voltage system must substantially equal that of the average electron beam currents emanating from cathodes 23, 24 and 25. Because the majority of electrons directed toward viewing screen 22 are attracted to accelerating electrode 21 and return to ground through the high voltage circuitry, the current through winding 36 and resistor 38 also equals the average beam current of the CRT. As a result, the average voltage developed across resistor 38 is proportional to CRT beam average current and forms an appropriate input signal for shutdown circuit 100.

As mentioned, the voltage divider coupled between accelerating electrode 21 and ground produces focus and screen electrode voltages. As is known, each point on such a divider changes proportionately with changes in applied potential. Because the CRT accelerating potential may change due to power line variation or beam current loading it is advantageous that the sources of focus and screen electrode voltages "track" with high voltage changes to maintain optimum performance. In a similar manner to focus and screen electrode voltages, the potential at the movable contact of potentiometer 68 also changes in proportion to accelerating potential, and forms the second input signal to shutdown circuit 100.

The operation of circuit 100 is best understood if considered initially in its general function. In response to either an excessive voltage developed across resistor 38 (indicating prohibitive CRT beam currents) or an excessive voltage at the movable contact of potentiometer 68 (indicating prohibitive accelerating potential) a high current shunt path between the output of power supply 42 and ground becomes conductive. The regulation of power supply 42 is overcome and the operating supply available to oscillator 32 is substantially reduced.

In the system shown Zener diode regulation of the output voltage of power supply 42 is employed. As mentioned, such a device regulates voltage due to its avalanche or reverse breakdown characteristic. Once conducting in the reverse direction, the voltage across the Zener will not substantially exceed the breakdown potential. However, the Zener regulator shown will not prohibit reductions of power supply voltage below the breakdown voltage (the mechanism by which shutdown circuit 100 operates). For this reason it is advantageous to use such regulation in the described embodiment. It should be obvious, however, that the use of different regulator construction with corresponding regulation defeating systems can be envisioned without departing from the spirit of the present invention. Regardless of the regulator used the degree of supply reduction during shutdown is selected such that oscillator 32 ceases to produce a horizontal scansion signal which, of course, terminates the production of acceleration potential.

Once activated, the shutdown circuit "latches", that is, maintains the termination of high voltage notwithstanding changes in input signals. This characteristic is important since both accelerating potential and beam current will decrease once the horizontal oscillator is disabled. But for such circuit latching, receiver operation could be restored without removing the failure cause. Or perhaps worse the receiver would vascillate between shutdown which would reduce high voltage and beam current which in turn would turn off the shutdown circuit causing a restoration of high voltage and so on.

Turning now to the operation of circuit 100 in greater detail, the combination of PNP transistor 50 and NPN transistor 60 forms the well known two-transistor analog of a silicon controlled rectifier (SCR). Accordingly, a positive voltage at base 62 which exceeds the voltage at emitter 61 by approximately 0.6 volts causes transistor 60 to conduct. The conduction of transistor 60 produces a current flow through resistor 55 establishing a lower potential at base 52 than that of emitter 51 causing transistor 50 to conduct. The transistor pair forms a regenerative switch in that conduction of transistor 50 drives base 62 more positive causing transistor 60 to conduct heavily further increasing transistor 50 conduction. The conduction of transistors 50 and 60 essentially couples Zener 64 to the output of power supply 42. Zener 64 has a reverse breakdown substantially lower than Zener 57 and when coupled to power supply 42 by way of transistors 50 and 60, it maintains the output voltage of power supply 42 at a substantially reduced voltage. The reduced voltage is, of course, low enough to cause oscillator 32 to cease producing signals.

A similar "triggering" of the transistor pair may be induced by a reduction of the voltage at base 52 in which case transistor 50 initially conducts producing a positive voltage at base 62. Transistor 60 then turns on further reducing the voltage at base 52 and causing the regenerative switching actions described above to proceed.

Once conducting, transistors 50 and 60 remain in saturation despite changes of the voltages applied to bases 52 and 62. Only the removal of the positive voltage applied to emitter 51 will cause the transistor pair to turn off. This characteristic provides the desired latching function of the system.

As mentioned above, the voltage at the movable contact of potentiometer 68 changes in proportion to changes in acceleration potential and determines the voltage at base 62. Emitter 61 is maintained at a substantially constant potential by Zener 64, resistor 66 and capacitor 65. The use of Zener 64 in this manner permits emitter 61 to be maintained at a high enough potential to avoid false triggering by noise energy incident on base 62 or the leads coupled thereto without prohibitive reduction of the gain of transistor 60. Because voltage changes at base 62 directly alter the base-emitter voltage of transistor 60, an increase in accelerating potential sufficient to raise base 62 more than 0.6 volts with respect to emitter 61 overcomes the offset of emitter 61 and turns on transistor 60 and activates the shutdown circuitry. Capacitor 66 filters the voltage at base 62 which improves circuit immunity to "noise" and other "false" triggers.

Turning now to the operation of the shutdown circuitry in response to excessive beam currents, as mentioned above the voltage developed across resistor 38 is substantially proportional to the combined beam currents emanating from cathodes 23, 24 and 25. The negative voltage developed across resistor 38 is filtered to a DC potential by capacitors 39 and 74. Shutdown circuit 100 is intended to respond to beam current changes which exceed the desired maximum. To facilitate this selective operation a threshold is established which must be exceeded to activate the beam current responsive portion of the shutdown circuit. Accordingly, resistor 56 couples an additional current to ground through resistor 38 which opposes the negative voltage developed thereon due to beam current. The current supplied by resistor 56 is constant, that is, it does not vary as a function of beam current. However, the negative voltage developed across resistor 38 due to current in transformer winding 36 bears a direct relationship to beam current. As a result, when the combined beam currents in CRT 20 exceed a predetermined level the voltage at the junctions of resistors 38 and 56 becomes negative notwithstanding the opposing current contributed by resistor 56.

The voltage on resistor 38 is coupled via a resistor 75 to the emitter of common base transistor 70. Because base 72 is at ground potential a negative 0.6 volts at emitter 71 will cause it to conduct. The conduction of transistor 70 produces a voltage drop across resistor 55 which again turns on transistor 50, the conduction of which turns on transistor 60 producing the high current shunt path between the output power supply 42 and Zener diode 64. Capacitor 74 also slows down the operation of transistor 70 for additional rejection of noise and other sources of false triggering.

In addition to the noise and false triggering rejection achieved by the use of capacitors 66, 65 and 74 the switching action of transistors 50 and 60 are degenerated, that is, "slowed down" by the parallel combination of resistor 55 and capacitor 54. In total these safeguards provide excellent false trigger rejection. However, in the event the circuit is falsely triggered, the voltage at emitter 51 may be removed "unlatching" the shutdown circuit by simply turning off the receiver for a moment and then turning it back on.

What has been described is a novel high voltage shutdown system for use in a television receiver. The system simultaneously achieves shutdown protection for fault conditions of excessive accelerating potential and beam current using a transistor pair configured to perform in a similar manner to a silicon controlled rectifier. In addition to the advantages of silicon controlled rectifier switching characteristics, the transistor pair permits control of switching speed and may be triggered at both transistor bases yielding increased performance and flexibility.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

What is claimed is:

1. For use in a television receiver having a cathode ray tube display device in which one or more electron beams are directed to a viewing screen, means causing said beams to scan said screen, and high voltage generating means producing an electron accelerating potential for said cathode ray tube, high voltage shutdown means comprising:

high voltage detecting means producing a first error signal when said accelerating potential exceeds a predetermined voltage;

beam current detecting means producing a second error signal when the current of said electron beams exceeds a predetermined level; and high voltage disabling means, coupled to said high voltage detecting means and said beam current detecting means, said high voltage disabling means including common fault means for rendering said high voltage generating means inoperative in response to either said first or second error signals.

2. High voltage shutdown means as set forth in claim 1 wherein said high voltage disabling means include:

first and second amplifiers of opposite polarity each having input, output and common electrodes, each of said input electrodes of said amplifiers being connected to said output electrodes of the other of said amplifiers.

3. High voltage shutdown means as set forth in claim 2, wherein said first error signal is coupled to said input electrode of said second amplifier and said second error signal is coupled to said input electrode of said first amplifier.

4. High voltage shutdown means as set forth in claim 3, wherein said first and second amplifier comprise PNP and NPN transistors respectively and said input, output and common electrodes of said amplifiers comprise the base, collector and emitter electrodes respectively of said transistors.

5. High voltage shutdown means as set forth in claim 4, wherein said high voltage generating means includes a source of operating potential and wherein said high voltage disabling means render said high voltage generating means inoperative by substantially reducing said operating potential.

6. High voltage shutdown means as set forth in claim 5, wherein said disabling means are coupled to said source of operating potential providing a high current shunt path to ground.

7. High voltage shutdown means as set forth in claim 6, wherein said disabling means includes means reducing the switching speed of said disabling means to improve noise and false trigger rejection.

8. High voltage shutdown means as set forth in claim 7, wherein said means reducing the switching speed of said disabling means include a parallel resistance and capacitance network coupled between said emitter and base electrodes of said PNP transistor.

9. High voltage shutdown means as set forth in claim 6, wherein said disabling means includes a Zener diode coupled to said emitter of said NPN transistor maintaining said emitter at a substantially constant potential and improving the false triggering rejection of said disabling means.

* * * * *